March 19, 1963  G. A. SCHERRY  3,081,497
METHOD FOR MOLDING OBJECTS WITH INSERTS
Filed May 6, 1960

INVENTOR.
George A. Scherry
BY Mueller & Aichele
Attys.

United States Patent Office 3,081,497
Patented Mar. 19, 1963

3,081,497
METHOD FOR MOLDING OBJECTS
WITH INSERTS
George A. Scherry, Berkeley, Ill., assignor to Ralph M. Hill and Gordon E. Gray, La Grange, Ill., a partnership
Filed May 6, 1960, Ser. No. 27,420
1 Claim. (Cl. 18—59)

This invention relates to improved molding methods, and more particularly to methods of molding used in making such small parts having inserts imbedded therein and extending therefrom.

In the art of manufacturing molded plastic articles in pressure feed molding machines, such as plunger-type presses, there exists a substantial problem in producing small objects having inserts imbedded therein which must protrude therefrom in accurate alignment. With the molding machines referred to above, as well as with other pressure molding processes such as injection molding and die casting, it is very difficult to hold the pronged inserts in position during the period of the operating cycle when powder and/or molten material is being rammed or forced into the die or mold cavity under high pressure. The molding material entering through the gate at the side of the mold flows very rapidly into the cavity and swirls about the delicate pins, tending to skew or tilt them out of accurate alignment. The forces exerted by the turbulent material will also tend to cause flow of material about the pins and leakage through apertures in the mold which receive the pins. As a result, undesirable fins or flashing are formed around the portion of the insert protruding from the completed molded object and clogging occurs in the mold apertures.

Accordingly, it is an object of the present invention to provide an improved method for rapidly and accurately molding small parts having inserts imbedded therein.

A feature of the invention is the provision of a method for molding parts having imbedded therein at least one insert, the insert being provided with a shoulder which seats in a recess located in one mold block and a shaped end which is deformable under pressure and which is engaged by positioning means extending from the other mold block. Positive engagement is provided between the positioning means and the insert to initially hold the insert without causing damage thereto, and the shoulder is thereafter held against the recess by pressure of the material in the mold.

Figure 1:
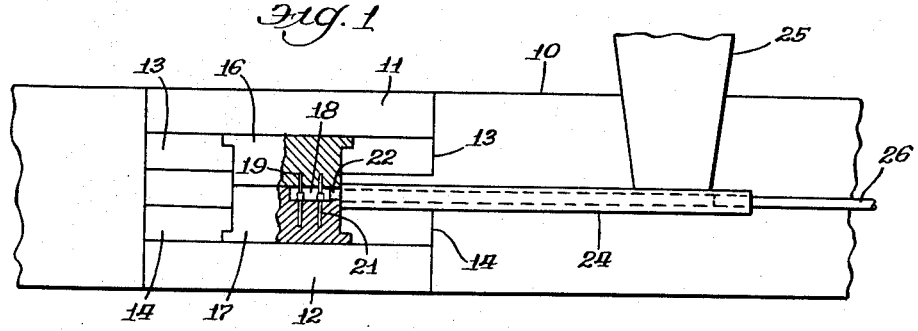
FIG. 1 is a fragmentary elevational view partly in section of a plunger type transfer molding machine with a multiple mold assembly in accordance with the invention.

Referring now in more detail to the accompanying drawing, FIG. 1 schematically represents the transfer press and mold portions of an automatic plunger type molding machine. The press and mold apparatus are supported by a horizontal rail 10 which in turn is supported by other portions of the automatic molding machine not shown in FIG. 1. Included in the mold portion are a movable heater platen 11 and a fixed heater platen 12, the platen 11 being adapted for vertical movement by standard linkages or other means not shown so that the mold can be tightly clamped between the platens. Both platens serve as heating means for the press and may include heating cartridges and thermostatic elements for controlling the energization thereof. Secured to the movable platen 11 is a mold retaining plate 13 which supports the upper mold block 16. Similarly, fixed platen 12 carries a mold retaining plate 14 which supports the lower mold block 17.

The mold blocks are of the fast-acting type and are commonly constructed of metal to conduct heat from the heater platen to the molding materials. In the particular set illustrated, the lower mold block or drag 17 is of the multiple type having four mold recesses or cavities 18 formed in its molding face of such configuration to form the desired finished product when enclosed by the molding face of upper mold block 16. One of these cavities 18 is illustrated in section in FIG. 1 with positioning means 19 and mold inserts 21, to be subsequently described, extending into the cavity.

Figure 2:
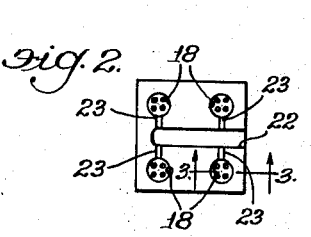
FIG. 2 is a top plan view of the lower multiple mold block.

The configuration of the parting face of the lower mold block 17 is more clearly shown in the plan view of FIG. 2. The recesses or cavities 18 in the mold block 17 are joined by a runner or channel 22 which provides a passage for the molding material received from a transfer cylinder 24 (FIG. 1). Reduced channels or gates 23 are provided between channel 22 and each cavity so that the finished casting has small cross-sections at these points and the molded pieces are easily broken therefrom.

The material to be molded is ram fed to the above mold set by the automatic pressure feeding apparatus shown at the right of the mold set in FIG. 1. This mechanism generally includes a hopper 25 which is designed to hold plastic molding material in its powdered or granular form. This powdered material may flow by force of gravity or be positively fed by known feed mechanisms to the transfer cylinder 24. The transfer cylinder extends from the hopper into the mold section, between the retainer plates 13 and 14, and terminates against the side of the mold blocks 16 and 17 so that the hollow passage through the cylinder is aligned with channel 22. After the powdered material has entered the transfer cylinder it is forced therethrough and into channel 22 and gates 23 and then to cavities 18 by a plunger 26 which slides within transfer cylinder 24. The mechanism for operating the plunger is normally an automatically controlled air or hydraulic cylinder mechanism of known construction.

Figure 3:
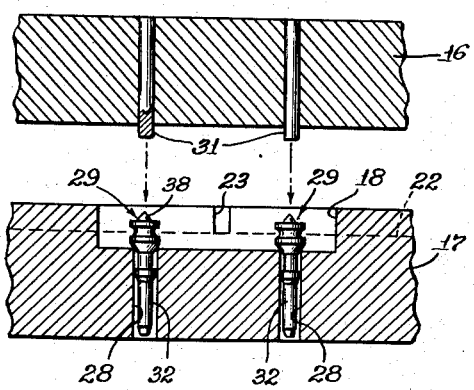
FIG. 3 is a greatly enlarged and exploded fragmentary view of a part of the multiple mold assembly taken in section on line 3—3 of FIG. 2.
Figure 4:
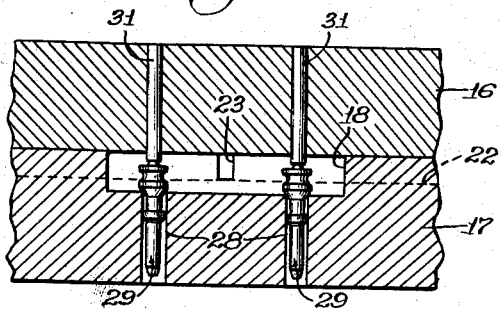
FIG. 4 is a fragmentary view of the mold assembly shown in FIG. 3 illustrating the components thereof in closed position.

In FIG. 3 the movable upper mold block 16 is shown in a raised position representing the open condition of the mold. Lower mold block 17 is provided with vertical apertures or recesses 28 corresponding in number and location to the mold inserts of the molded product. These apertures extend upwardly and open into the mold cavity 18 so that mold inserts, such as pointed insert pins 29, may be placed therein and positioned thereby. The annular edge of the hole formed by the entrance of apertures 28 into the bottom surface of cavity 18 provides a seating surface for the heads of inserts 29. Opposite from and aligned with apertures 28 are located positioning means, here shown as vertical positioning rods 31 mounted in the movable upper mold block 16. These rods may be either permanently mounted or adjustably secured in the mold block. Rods 31 project downward from the upper face of the mold cavity a predetermined distance depending upon the height dimension of the head portion of the particular insert being used. With the blunt nosed rods 31, a projecting dimension is established which will cause them to engage the upper end of their respectively aligned inserts 29 with an interference fit. FIG. 4 more clearly illustrates the deformation characteristic of the engagement between positioning rods 31 and inserts 29 when mold blocks 16 and 17 are in their closed condition.

Figure 5:
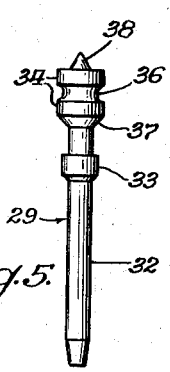
FIG. 5 is an elevational view of one of the pronged inserts of the invention shown in FIGS. 3 and 4, but enlarged still further.
Figure 6:
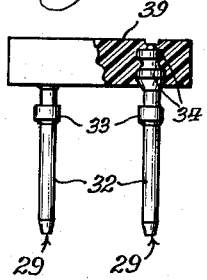
FIG. 6 is an elevational view of a molded object produced by the mold assembly shown in FIGS. 3 and 4 with a portion thereof broken away.

The insert shown greatly magnified in FIG. 5 is designed to cooperate with the blunt ended positioning rods 31 in the mold assembly constructed in accordance with the invention. In the product produced from the disclosed mold embodiment, the insert may function as a terminal pin in a small electrical terminal block assembly. It is preferred that these parts be accurately dimensioned, with the protruding pins accurately aligned and free of stock flashing and runs. FIG. 6 illustrates the completed product with the insert pins 29 imbedded in and supported by the molded plastic terminal block 39. The terminal pin is very tiny and thus quite fragile even though constructed of metal such as brass. For example, in miniature electrical terminal blocks produced in accordance with the invention such pins ranged in diameter from .046 inch down to .020 inch and ranged in length from .414 inch down to .145 inch.

Usually the longest portion of the insert consists of a prong 32 having a flange 33 therearound which may serve as a combination stop and positioning element. The head of the pin is enlarged and may be shaped with a pair of retaining flanges 34 formed by cutting a groove 36 therebetween. A conical seating surface 37 is provided on a shoulder formed on the underside of the head portion. Finally, the top of the head is turned down to a very fine conical or pointed portion 38.

Referring again to FIG. 4 it will be seen that, in the closed position of the mold blocks 16 and 17, the positioning rods 31 not only engage the points 38 of the inserts 29 but also deform or squash the points under the closing pressure of the molds. It is also to be noted that the conical seating surfaces 37 of the inserts are dimensioned so that they will be firmly seated by the positioning rods in the upper end of the apertures 28 to seal off the apertures in the manner of a poppet valve.

In operation, the inserts are dropped into apertures 28 by any convenient means and then the mold set is closed. As mold block 16 is brought down to mate with block 17, the aligned rods 31 will first contact points 38 and thus drive the inserts slightly downward so that the seating surfaces 37 firmly contact the upper surface of the apertures 28. Further pressure by rods 31 on points 38 will cause the points to deform slightly. Since the points are the weakest portion of the compressively stressed insert structure they will be the first to deform. thus, their shape is sacrificed so that their deformation will prevent damage to the remaining portions of the insert structure which might otherwise result from the desired interference fit. A small deformation of conical face 37 may also result, but this does not interfere with the position or alignment of the terminal pins in the finished product. It should be noted again at this point that these are very small pins of a delicate nature which are easily damaged.

Having accurately seated and positioned the inserts, the rod in interference engagement with the point continues to serve another function in the next phase of the operating cycle. When the mold is tightly closed, plunger 26 is actuated to force the molding powder from the transfer cylinder into channel 22 and thence through gates 23 to the individual mold cavities 18. The entire operation is characterized by rapidity and high pressure and therefore the powder material enters the cavities 18 and swirls around and against the inserts with great force and turbulence which, were the inserts not held in position by the rods 31, would skew them out of line and unseat them from the apertures.

During the initial flow of powder to the cavity no material could escape through apertures 28 due to the mechanically maintained seal between seating surface 37 of the inserts and the annular upper edge of apertures 28. The force exerted by rods 31 is sufficient to maintain a mechanical seal as against the leakage of the material before the cavity is completely filled. But if enough force were applied by these hold-down rods to produce a liquid seal under the final molding pressure, the delicate pin inserts would be endangered. However, as the molding pressure within the cavity is increased to its final value, the sealing function is assumed by the cooperation of the insert head with the surrounding material in its plastic state. The hydraulic pressure within the cavity will produce a resultant pressure downward on the insert head so that it then seals itself like a hydraulic check valve. Thus the steps and structure of the invention provides a mold assembly in which the protruding inserts are accurately aligned and positioned, and in which they are also constantly sealed through all the stages of the plastic molding process. The final product will therefore emerge from the mold as shown in FIG. 6, free of any flash at the junction of the face 37 of prong 32 and the molded block 39, and the apertures 28 in mold block 17 will be clear and free of any material leakage.

Figure 8:
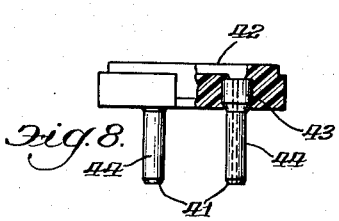
FIG. 8 is an elevational view of a molded object produced in the mold assembly shown in FIG. 7 and with a portion thereof broken away.
Figure 7:
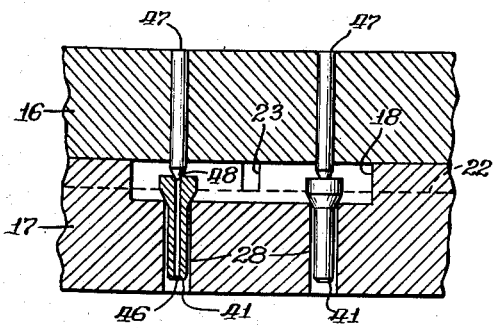
FIG. 7 is a greatly enlarged elevational fragmentary view in section of a modified mold assembly which uses a tubular type of insert in accordance with the invention.

FIGS. 7 and 8 illustrate respectively a modified mold assembly and a molded product produced by the same in accordance with the invention. Modified mold inserts 41 are provided which are generally the same size as inserts 29, being miniature pins molded into a miniature electrical terminal block 42. However, they are simpler in configuration in that the enlarged head portion 43 thereof is merely cylindrical, as is the corresponding prong portion 44. A conical seating surface is provided on an undershoulder of head 43 in the manner of surface 37 on insert 29. The principal difference between inserts 41 and 29 resides in the hole or aperture 46 through the center of insert 41. Modified positioning rods 47 are provided in mold block 16 in the manner of the previous embodiment, but instead of having blunt engaging ends they are provided with pointed ends 48 which may be case hardened for extra wear. As in the previous embodiment rods 47 are designed to extend from the parting face of block 16 a distance sufficient to cause an interference fit between their pointed end 48 and inserts 41. But in this embodiment the deformation will occur principally in head 43 of insert 41 where point 48 enters aperture 46. With this construction slight expansion will occur in the head of insert 41 in addition to the deformation of aperture 46, while the pointed end 48 remains undeformed. Besides providing a deformable engagement to protect the insert pin while positioning it, the point-in-aperture construction effectively seals the aperture 46 from the pressurized material in cavity 18. In other respects the modified form of the invention shown in FIGS. 7 and 8 corresponds with that of the previous embodiment.

Figure 9:
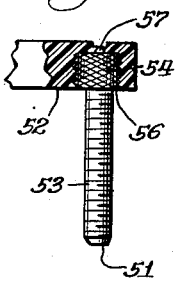
FIG. 9 is a fragmentary elevational view of another molded object produced in the mold assembly of FIGS. 3 and 4, with a modified insert imbedded therein.

In FIG. 9 another type of insert 51 is shown imbedded in a plastic block 52 to form a molded object of the type produced in the mold assembly of FIGS. 3 and 4. Insert 51 has a threaded stem 53 which extends from a knurled head 54 having flat seating surface 56 on the underside thereof. The insert is positioned and held much like the previous inserts, and rods 31 engage the finely pointed projection 57 located on the top of head 54 and may deform the same to hold the insert in the desired position.

The above described mold assembly is well suited for the manufacture of diminutive parts with fragile projecting members molded therein. The positioning rods may be securely imbedded in the mold block 16 to withstand repeated engagements over a long operational run. It is a simple matter to machine or otherwise produce the configuration of the cooperating shaped ends on the positioning rods and inserts in the manner of the foregoing embodiments. Allowance for deformable cooperation therebetween permits positive engagement over a range of tolerance variations which in turn will broaden dimensional limits and thereby reduce the production costs of the mold assembly and inserts. The range in the positive engagement is also well adapted for rapid cycle automatic molding machines since unavoidable wear with attendant tolerance runout is compensated for by this range of operable engagement.

Although the disclosed embodiments of the invention are concerned primarily with molded plastic terminal blocks with metallic terminal pins imbedded therein it will be obvious to those skilled in the art that other combinations of materials could also be utilized without varying from the inventive concept disclosed by the foregoing structure. The invention is also well suited to other forms of pressure molding such as die casting wherein the molding material is in a molten state prior to and during the cycle of rapid pressurized insertion into the mold.

What is claimed is:

The method of molding an insulating plastic part having an individual conducting insert imbedded therein in a mold having a recess for receiving the insert, said method consisting of the steps of, forming an individual insert with a first portion to extend from the part, a second portion to be imbedded in the part and having a deformable end, and a surface opposite the deformable end joining the first and second portions and shaped to mate with a recess provided in the mold, placing the insert in the mold with the first portion of the insert received in the recess, closing the mold to form a cavity and simultaneously engaging and compressing the deformable end of the second portion of the insert with a respective portion of the mold which extends into the cavity to thereby hold the shaped surface of the insert against the recess to prevent leakage of molding material therebetween, introducing a charge of powdered insulating molding material into the mold cavity under pressure and heat, increasing the pressure in the mold to a value sufficient to liquify the molding material while the portion of the mold remains in individual engagement with the insert, so that the molding material engages the exposed surface of the second portion of the insert and exerts pressure thereon, with the exposed surface being shaped to provide a resultant pressure in a direction to hold the shaped surface of the insert against the mold recess, and maintaining the applied heat and pressure until the molding material is cured.

References Cited in the file of this patent
UNITED STATES PATENTS

| | | |
|---|---|---|
| 1,594,940 | Goodridge | Aug. 3, 1926 |
| 1,886,176 | Gagnon | Nov. 1, 1932 |
| 1,935,942 | Conner | Nov. 21, 1933 |
| 2,040,674 | Severence et al. | May 12, 1936 |
| 2,658,238 | Rizzo | Nov. 10, 1953 |
| 2,946,093 | Everett | July 26, 1960 |